(12) United States Patent
Lin

(10) Patent No.: US 7,774,699 B2
(45) Date of Patent: Aug. 10, 2010

(54) PARALLEL DATA TRANSFORMATION

(75) Inventor: Mark Lin, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1188 days.

(21) Appl. No.: 11/372,929

(22) Filed: Mar. 10, 2006

(65) Prior Publication Data

US 2007/0214170 A1    Sep. 13, 2007

(51) Int. Cl.
*G06F 17/00* (2006.01)
(52) U.S. Cl. .................. 715/236; 715/205; 707/102; 709/203
(58) Field of Classification Search ......... 715/234–237, 715/253, 239
See application file for complete search history.

(56) References Cited

U.S. PATENT DOCUMENTS

| | | | |
|---|---|---|---|
| 2004/0044965 A1* | 3/2004 | Toyama et al. | 715/523 |
| 2005/0273772 A1* | 12/2005 | Matsakis et al. | 717/136 |
| 2008/0215559 A1* | 9/2008 | Fontoura et al. | 707/4 |
| 2008/0320382 A1* | 12/2008 | Kuznetsov et al. | 715/234 |

* cited by examiner

*Primary Examiner*—Doug Hutton
*Assistant Examiner*—Quoc A Tran
(74) *Attorney, Agent, or Firm*—Townsend and Townsend and Crew LLP

(57) ABSTRACT

A method for transforming a starting data structure into a resultant data structure is provided. The data structures may be embodied in any language or format, including the Extensible Markup Language (XML). The starting data structure is separated into segments. The transformation may be analyzed to determine which loops are top level and separable. The starting data structure may be analyzed to estimate the most costly loop, then separated along the most costly loop. Segments are transformed independently, and transformed segments are recombined to create the resultant data structure.

22 Claims, 9 Drawing Sheets

```
                <?xml version="1.0" encoding="ISO-8859-1"?>
110
      ─────<bookstore>
120 ─────────<book>
  130 ───────────<title lang="en">Harry Potter</title>
140 ─────────────<author>J K. Rowling</author>
150 ─────────────<year>2005</year>
160 ─────────────<price>29.99</price>
             </book>
          </bookstore>                             ◀── 100
```

```
<?xml version="1.0" encoding="iso-8859-1" ?>
<rss version="2.0">
  <channel>
    <title>Cool Music</title>
    <link> http://www.10.1.1.12.com</link>
    <description>Find CDs and music reviews </description>
    <item>
      <album> Blood on the Tracks </album>
      <review> Blood is among Dylan's masterpieces. </review>
    </item>
    <item>
      <album> Master of Puppets </album>
      <review> A defining album of thrash metal. </review>
    </item>
  </channel>
</rss>
```

FIG. 3A

```
405  <?xml version="1.0" encoding="UTF-8" ?>
     <fo:root xmlns:fo="http://www.w3.org/1999/XSL/Format">
415   <fo:page-sequence master-reference="master0">
420    <fo:title>Hello Moto</fo:title>
425    <fo:flow flow-name="region-body">
430     <fo:block xdofo:xliff-note="Title">
435      <fo:basic-link external-destination="http://10.1.1.12">
          <fo:inline>Cool Music</fo:inline>
         </fo:basic-link>
                                                              440
        </fo:block>

<fo:block xdofo:xliff-note="Description">
445      <fo:inline>Find CDs and music reviews</fo:inline>
        </fo:block>

<fo:block xdofo:use-attribute-sets="b_1">
450      <fo:inline> Blood on the Tracks </fo:inline>
        </fo:block>

<fo:block xdofo:use-attribute-sets="b_1">
455      <fo:inline> Blood is among Dylan's masterpieces.</fo:inline>
        </fo:block>

<fo:block xdofo:use-attribute-sets="b_1">
460      <fo:inline> Master of Puppets</fo:inline>
        </fo:block>

<fo:block xdofo:use-attribute-sets="b_1">
465      <fo:inline> A defining album of thrash metal.</fo:inline>
        </fo:block>

</fo:flow>
      </fo:page-sequence>
     </fo:root>
```

PARALLEL DATA TRANSFORMATION

BACKGROUND OF THE INVENTION

The present invention relates generally to data processing and more particularly to the transformation of large data structures, which may facilitate easier display, analysis or communication of the data structure.

The modern world generates a vast amount of data everyday, including sales information, stock quotes, news, consumer demographics, and much more. Consumers, scientists, business management, politicians, and the computers and other electronic devices with which they work are some of the entities that request the vast amount of data. The requests include actions such as displaying, communicating, and analyzing the data. It can be problematic for the data to be communicated, displayed, and accessed easily by each entity, particularly when the amount of data is large.

The data is often structured or organized hierarchically, such as in a tree or node structure or in a parent-child relationship. There are many different computer languages and formats that allow a user to define, classify, organize, and/or store the structure of the data, such as SGML, XML, HTML, C++, Javascript, PHP, ASP, and many more. In object-oriented programming, the data may be organized by one class of data containing another class of data. Equivalently, in markup languages or syntax, such as XML, data is typically defined with tags or semantics within a document.

FIG. 1A illustrates the hierarchy of the data in an example XML document 100 as expressed in the hierarchical tag structure, and FIG. 1B graphically illustrates the hierarchy as a tree of nodes. Each box in FIG. 1B represents a node. The root (or document) node, which may have one or more element nodes, is <bookstore> 110. Element node <book> 120 is a data type that can be found within a "book store." Each node has a single parent, and <bookstore> is the parent of <book>. Nodes may have zero, one or more children. The nodes <title> 130, <author> 140, <year> 150, and <price> 160 are the children of the <book> node 120. There can be additional relationships as well. For example, siblings are nodes that have the same parent. The nodes <title> 130, <author> 140, <year> 150, and <price> 160 are siblings to each other. Ancestors of a node are the node's parent, parent's parent, etc. Descendants of a node are the node's children, children's children, etc. Each node is essentially an instance of a data variable type, including the root node. The variable name of a node is sometimes called a tag.

One problem with hierarchical data structures is that data is often stored in a structure that is not useful to an end user, such as a server, a client, a program, or an individual. The existing data structure may need to be transformed into a new data structure for purposes of an end user's need to view, analyze, and/or store the data in a different format or data structure. Additionally, the existing data structure often must be presented on different electronic devices, such as a computer monitor, television, a PDA, or a cell phone. Any of the different electronic devices may require different formats, such as HTML, PDF, etc. XML provides for simplified data interchange, and XSL is one tool that can handle this data manipulation for XML documents.

FIG. 2 illustrates the use of XSL to transform an XML document 230 into any number of other documents, such as another XML document 240, an HTML document 250, or any other such structured document 260. The XSL processor 210 takes as input the XML document 230 and an XSL style sheet (file) 220 that defines how to do the transformation. The XSL file 220 specifies how each node of the source tree for a first XML document 230 should appear in the result tree of a second XML document 240. XSL uses a sublanguage called XPath to refer to nodes in the input tree. The structure of the result tree can be completely different from the structure of the source tree. In constructing the result tree, elements from the source tree can be filtered and reordered, and an arbitrary structure can be added. Thus, the XSL processor 210 typically holds three trees: one tree for the source XML 230; one tree for the destination structure 240; and one tree for the XSL file 220.

Because the XSL processor 210 holds three trees, the transformation of one data structure into another data structure may take up a large amount of computing resources, such as memory and processor time. The amount of memory used often is more than a user has available, which may cause the computer system to crash, or otherwise become unstable. Also, the time to transform one data structure to another data structure may be so long that the transformation is impracticable.

It is therefore desirable to have an efficient method of transforming large data structures.

BRIEF SUMMARY OF THE INVENTION

The present invention relates generally to data transformation. In one embodiment, a method for transforming one data structure into a resultant data structure is provided. The data structures are hierarchical, where data elements have relationships of being parents, siblings, children, ancestors, or descendants. The starting data structure is separated into segments across elements with a sibling relationship. Each segment has at least one sibling not contained in the other segments. Each segment is then transformed independently. Combining the transformed segments then forms the resultant data structure.

In another embodiment, an information storage medium is provided that includes a plurality of instructions adapted to direct an information processing device to perform a set of steps for transforming one data structure into a resultant data structure. The steps include: separating the data into segments where each segment has at least one sibling not contained in the other segments, transforming each segment independently, and combining the transformed segments to form the resultant data structure.

In one embodiment, the different siblings of each segment have an equivalent parent. In another embodiment, each segment contains data common to the other segments. In a further embodiment, the beginning and/or ending of data in a transformed segment that is not common to other segments is marked. When recombining, non-common or common transformed data from one segment may be inserted into a document containing transformed data from another segment. The insertion may be done before or after the non-common data of that segment.

In another embodiment, a transformation file defines the transforming and an analysis is done of the transformation file to determine sets of repeated transformations that are separable. Also, an analysis of the starting data structure may be used to estimate which set of separable transformations will utilize the most computing resources. In one embodiment, the analysis is done by counting the data elements and their descendants accessed within a set of transformations. The number of elements and the amount of their descendants may be such that segmenting is determined to not be beneficial, and thus segmenting is not done. The number of elements and the amount of their descendants may also be used to determine the number of segments.

In another embodiment, each segment is further segmented into sub-segments. When transforming each segment, its sub-segments are transformed independently. Combining the segments includes combining the sub-segments. In one embodiment, the data structures are defined within XML files. In another embodiment, the transforming of one segment is done on a different processor than the transforming of a second segment.

A further understanding of the nature and the advantages of the inventions disclosed herein may be realized by reference of the remaining portions of the specification and the attached drawings.

BRIEF DESCRIPTION OF THE DRAWINGS

FIG. 3A illustrates a data structure embodied in an XML file that can be transformed.

FIG. 4A illustrates a transformed data structure embodied in an XSL-FO file.

DETAILED DESCRIPTION OF THE INVENTION

Embodiments of the present invention provide for efficient transformation of data from one hierarchical structure to another hierarchical structure. More specifically, the invention relates to transformations from one Extensible Markup Language (XML) document to another XML document using Extensible Stylesheet Language (XSL) transformations. One skilled in the art will recognize that while embodiments may be depicted in XML, any appropriate markup language or syntax may be used with various embodiments of the present invention. Also, as XML is described for use in categorizing data, embodiments of the invention may be implemented using any appropriate programming language, script, format, or protocol that defines and/or utilizes hierarchical data structures.

Figures 1A, 1B:
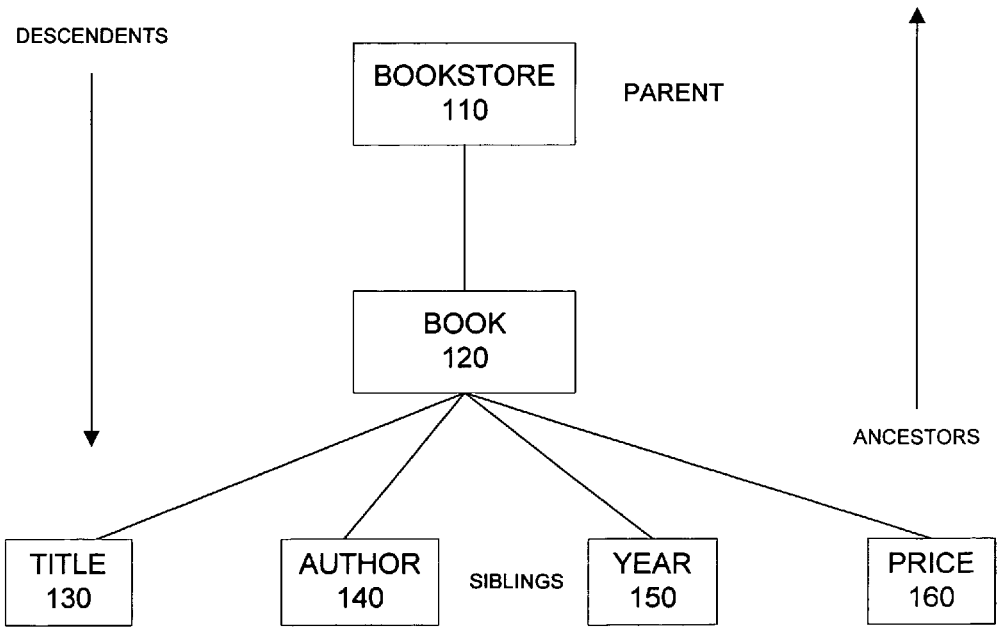
FIG. 1A illustrates a data structure using an XML file format.
FIG. 1B illustrates graphically the hierarchical data structure in FIG. 1A.
Figure 2:
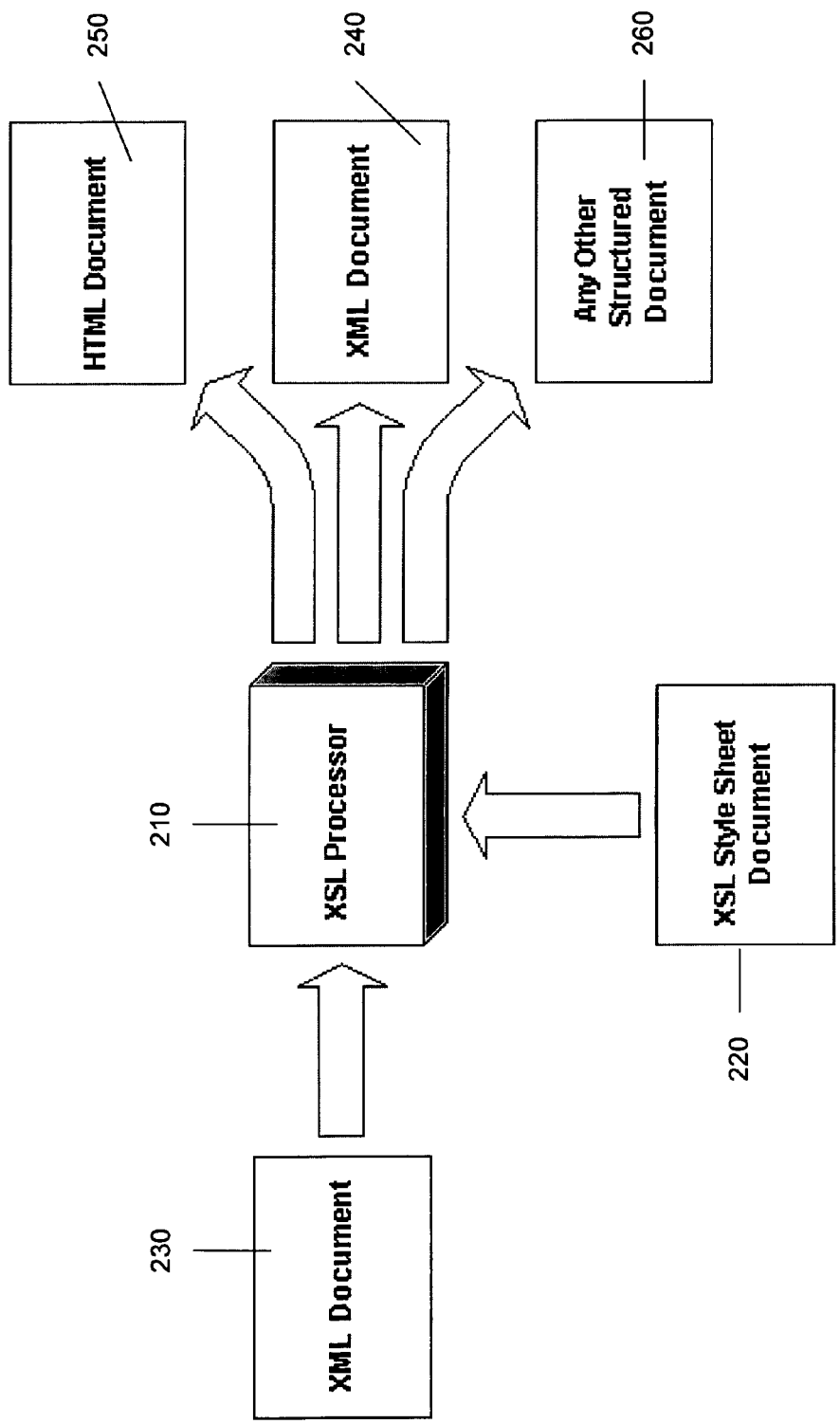
FIG. 2 illustrates a flow diagram for transforming one data structure to another data structure using XSL.
Figure 3B:
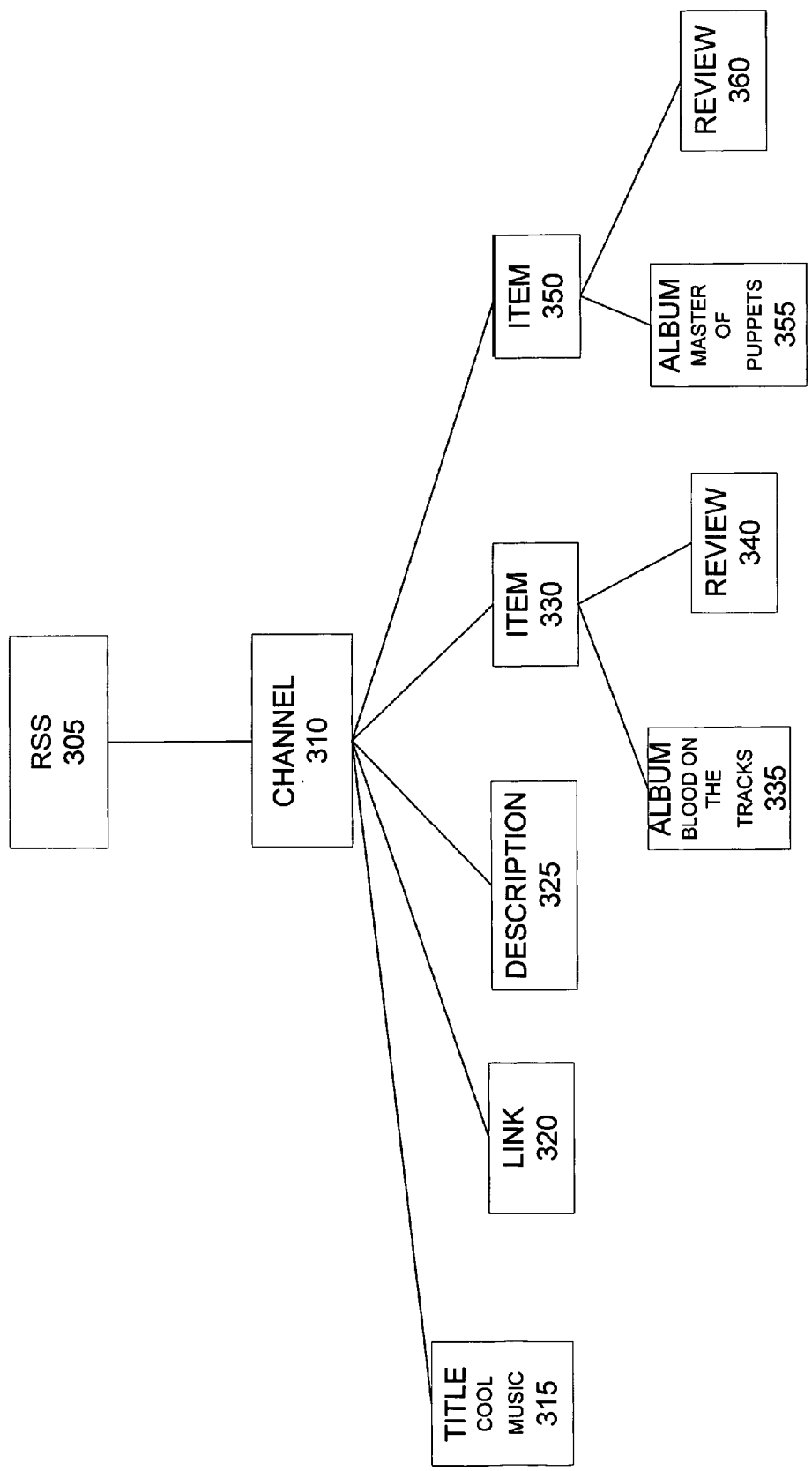
FIG. 3B illustrates graphically the hierarchical data structure in FIG. 3A.

FIG. 3A shows an example starting XML document 300, and FIG. 3B graphically illustrates the hierarchical data structure of XML document 300. The root node is <rss> 305, which is a format for syndicating news and the content of news-like sites. The <rss> node 305 has one child element node <channel> 310, which has child nodes <title> 315, <link> 320, <description> 325, <item> 330, and <item> 350. The <item> node 330 has child nodes <album> 335 and <review> 340, and <item> node 350 has child nodes <album> 355 and <review> 360. While XML document 300 shows only two <item> nodes, the number of "item" nodes may be in the thousands to millions. In FIG. 3B, some nodes include the data associated with them. Node <title> 315 has "Cool Music"; node <album> 335 has "Blood on the Tracks"; and node <album> 355 has "Master of Puppets".

Figure 4B:
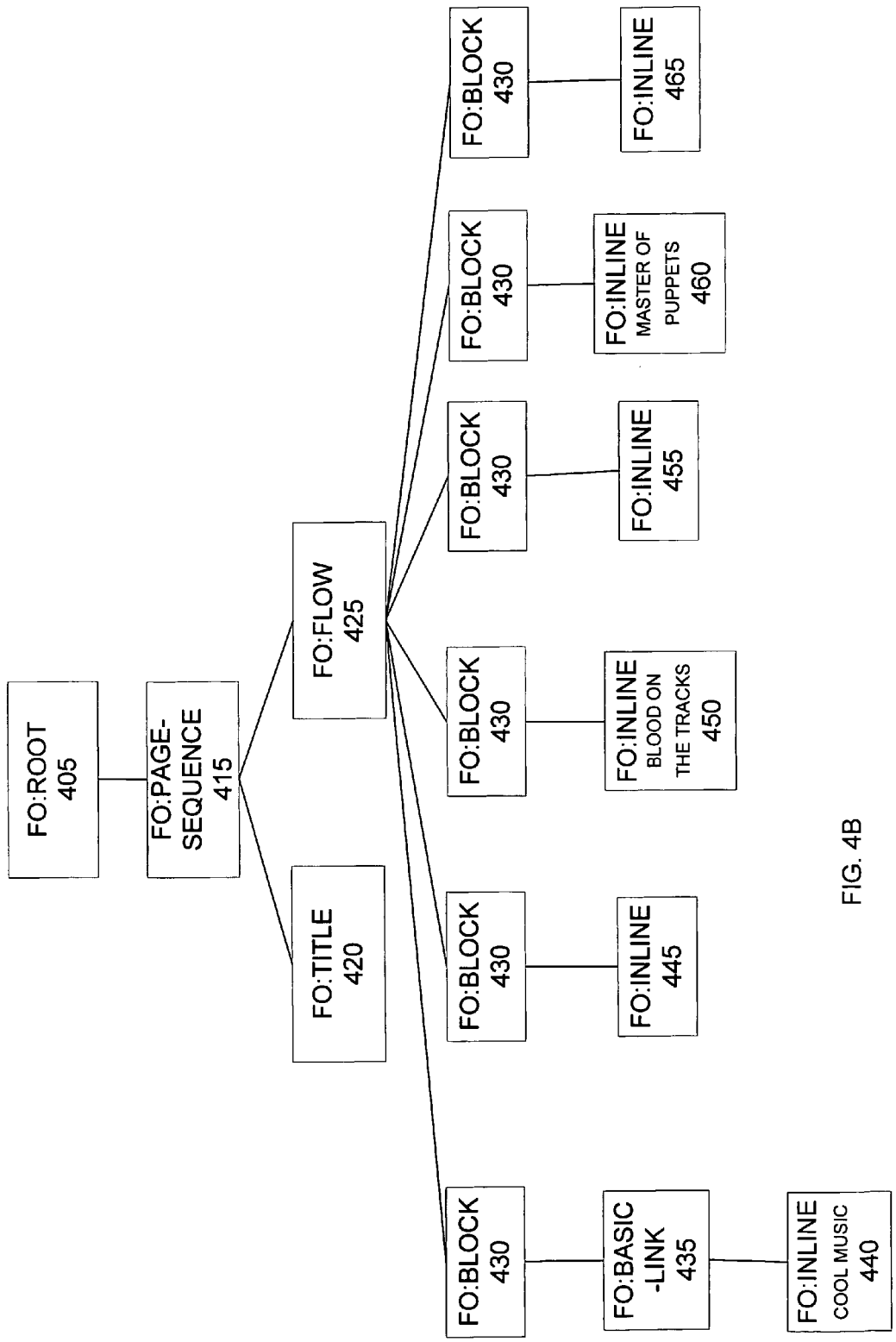
FIG. 4B illustrates graphically the hierarchical data structure in FIG. 4A.

FIG. 4A shows a transformed XML document 400 of XML document 300, and FIG. 4B graphically illustrates the hierarchical data structure of XML document 400. The transformed XML document 400 is specifically an XSL-FO file meant to facilitate displaying the data. The data is structured such that the root node is <fo-root> 405, which has child element nodes of <fo:page-sequence> 415, <fo:title> 420, and <fo:flow> 425. The node <fo:flow> 425 has multiple child nodes <fo:block> 430. The <fo:block> nodes 430 can have child nodes <fo:basic-link> 435 or <fo:inline> 440.

Referring to FIG. 4B, the transformation has added the nodes <fo:root> 405, <fo:page-sequence> 415, and <fo:flow> 425 before the data in document 300. The <title> node 315, containing the data "Cool Music", previously had ancestors <channel> 310 and <rss> 305. Now, the data is an <fo:inline> node 440 with ancestors <fo:basic-link> 435, <fo:block> 430, <fo:flow> 425, <fo:page-sequence> 415, and <fo:root> 405. Similarly, the <album> node 335, containing the data "Blood on the Tracks", is now an instance 450 of an <fo:inline> node having ancestors <fo:block> 430, <fo:flow> 425, <fo:page-sequence> 415, and <fo:root> 405. The <album> node 355, containing the data "Master of Puppets", is also now an instance 460 of an <fo:inline> node. The <album> and <review> nodes are in separate instances of an <fo:inline> node with different instances of parent node <fo:block>, wherein previously they had the same parent <item> node.

The transformation has taken the data structure of FIGS. 3A and 3B and put the data into the new data structure of FIGS. 4A and 4B, which has a different node structure and different node names. A transformation could be any reorganization, such as when new nodes are added, nodes are moved up a level, or nodes are placed into other data structures. A transformation may also involve nodes being filtered out, and node values being modified (i.e. numerical values being added, subtracted, multiplied, etc. or date values being reformatted to different date formats depending on some regional locale). A set of node values may also be aggregated, for example by using functions such as sum, average, min, max, etc. The root node, which is essentially the top level organization of the data, could be based on a tag or based on the file name. Also, the top level for the reorganization could be any level that has descendants.

Figure 5:
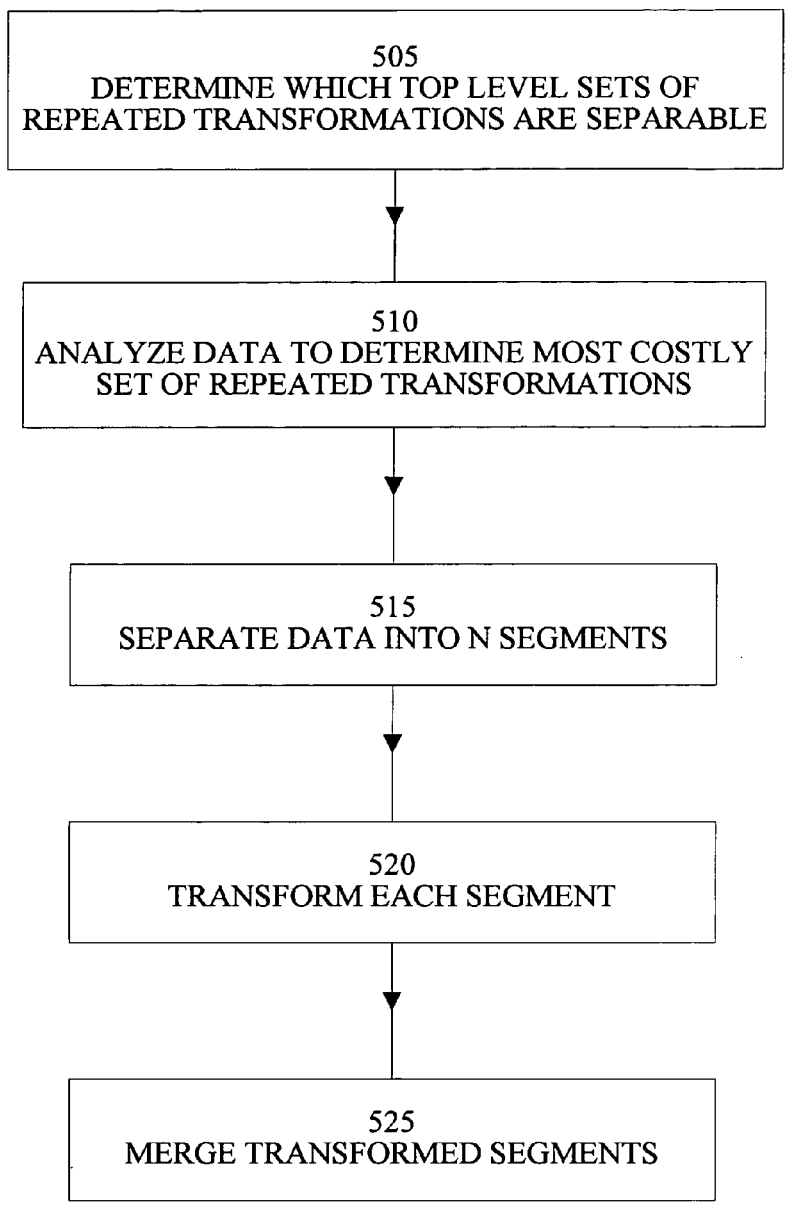
FIG. 5 illustrates a method for transforming a data structure according to an embodiment of the invention.

During a standard transformation, all of the data in a data structure, or file, is loaded from disk into a memory, such as RAM or cache. Given the amount of data in some files, this may be prohibitive. In order to overcome many of the above mentioned deficiencies in prior art transformation approaches, systems and methods in accordance with various embodiments of the present invention separate an XML document into XML segments using any of a variety of dissecting approaches discussed below. XSL or other transformation can then be run on the segments individually. The transformed segments then can be re-assembled intelligently back into a final XML document with a specific structure. For example, FIG. 5 shows a method 500 for transforming one data structure into another data structure according to an embodiment of the present invention.

Step 505 is an optional pre-processing step that helps to ensure accuracy and optimize method 500. Given that large amounts of data are being transformed, the transformation can be broken down to a set or multiple sets of smaller transformations. Some of these smaller transformations may be repeat transformations that act on different data that is similarly situated in the hierarchical data structure. For example, the same transformation may be done to each node of a set of siblings. Much like instances 330 and 350 of the <item> node of FIGS. 3A and 3B were similarly transformed. Additionally, repeated transformations may be nested within each other. One example of nested and repeated transformation are nested 'for-each' loops within an XSL stylesheet. The 'for-each' loop signifies a set of repeated actions on similar objects. Thus, any transformation with any type of loop, or unrolled loop, may benefit from embodiments of this invention.

Step 505 determines which sets of repeated transformations are separable. Separable means that one transformation may be done independently of another transformation. Thus, the transformations of a set are separable if they may be done independently of each other. For example, 'for-each' loops which contain relatively simple select statements are separable. XPath select expressions which are statically defined, such as select=".//<element name>", and other relative XPath location expressions are separable. Transformations with expressions including ancestor, descendant, following, preceding, sibling, or expressions containing multiple paths may not be separable. If such Xpath expressions are limited, the transformations still may be separable into sub-sets of transformations. For example, if there is cross-referencing, then the elements that are referenced may be loaded into memory or may be put into the same segment. As long as all of the segments do not reference each other, there still will be a savings in memory.

As an optimization, step 505 also determines which of the separable sets of transformations are at the top level. For example, which 'for-each' loops are at the top of the nest. In one embodiment, only the top level sets of transformations are analyzed to determine if they are separable.

Step 510 is also an optional step that analyzes the starting data structure to estimate which of the separable sets of transformations would use the most computational resources. In one embodiment, step 510 parses through the starting data structure looking for data types specified in the transformation file. This step can be done with a parser which is memory efficient. In an embodiment with multiple 'for-each' loops, step 510 determines which loop is the most expensive. For example, an estimate of the performance cost for a 'for-each' loop can be summed up by counting the number of children and their descendents for the element instances referenced in the XPath of the 'for-each' loop.

In one embodiment, step 510 uses a parser, such as a serial access (SAX) parser, to: (1) count the total number of xml elements; (2) count the number of xml elements used for each 'for-each' referenced in XSL; and (3) count the number of recursive children for each 'for-each' element referenced. In one embodiment, the 'for-each' element which contains the largest number of recursive children is used to determine the segmentation of the starting data structure. This 'for-each' element may be called the targeted element. In another embodiment, to determine if segmentation should be done, step 510 may divide the number of recursive children for the targeted element by the total number of elements. If the resulting number is greater than a configurable threshold value, such as 0.70, then segmentation is deemed beneficial.

In order to transform different parts of the starting data structure independently, step 515 separates the data into segments. Each segment includes some non-common data elements not contained in another segment. Some or all of these different data elements may have a first sibling relationship with each other, and other different data elements may have a second sibling relationship with a different parent than the first siblings. Additionally, the different data elements may be all of the same generation, or the different data elements may be from different generations. The number of segments may be a fixed or a variable number. In one embodiment, the segmentation process is not done if the number of segments would be less than a threshold value. A maximum number of segments may be specified, and each segment can be a separate XML file.

The number of segments and the number non-common data elements in each segment may be determined from analyzing the starting structure, such as is done in step 510. In one embodiment, the segmentation is only done when the number of certain data elements is greater than a threshold value. The number of segments can be based on the total number of data elements accessed in a set of repeated transformations, or a loop of transformations. The number of segments can also be based on the number of data elements with a certain relationship, e.g. sibling or same generation, which are accessed by the transformations. The number of elements may be divided by a configurable value to give the number of segments.

For example, if the number of data elements accessed by a 'for-each' loop is 1000 and the threshold value is 50, then the number of segments is 20. The number of elements per segment (call this 'p') would be the threshold value 50. The threshold value may not always equal the data elements per segment when the values do not divide evenly. Additionally, the number of data elements per segment may not be equal, for example when some data elements have more children than other data elements. In some embodiments, a certain data element with many descendents may be repeated in different segments and the descendents apportioned appropriately. Thus, depending on the number of descendents for this certain data element, two or more segments may have this same data element, but have different children under this certain data element. One skilled in the art will realize the number of different ways and criteria that one would use to calculate such values.

In some embodiments, the amount of data within a segment may still be significant. Thus, in one embodiment, each segment may be separated into sub-segments using steps 505, 510 and 515.

In one embodiment, any XML elements occurring before or accessed before the first targeted element will be inserted into each segment. The insertion point can be at any place which will not disturb the transformation. In this embodiment, this data is common to all segments. In other embodiments, the XML elements occurring before the first targeted element is inserted into only one segment.

In one embodiment, the next 'p' elements accessed by the targeted set of transformations are inserted into a first segment. A next set of targeted elements is inserted into another segment, where the number of elements may be 'p' or another suitable number. The same is done for the next segment, and this is repeated until there are no targeted elements left.

Any XML elements between the targeted elements may be inserted into each segment, into only one segment, or into any suitable number of segments. Similarly, any XML elements occurring after the last targeted element may be inserted into each segment, into only one segment, or into any suitable number of segments.

Figure 6:
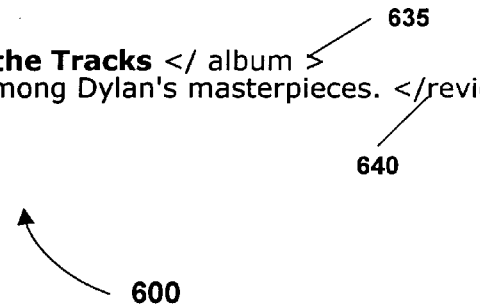
FIG. 6 illustrates two segments created in accordance with an embodiment of the present invention.
Figure 6:
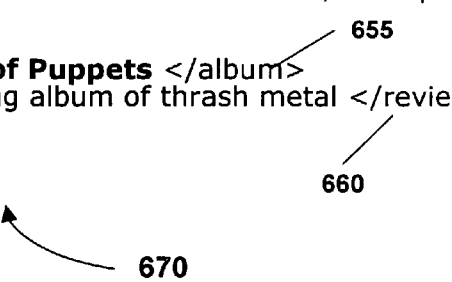

FIG. 6 illustrates two such XML segments 600 and 670 after step 515 has been performed on the XML file of FIG. 3A. Each segment may be a different file or parts of the same file. Each segment has the same data elements up to the targeted data elements for segmenting. For instance, both segments 600 and 670 have <rss> 605 and <channel> 620 nodes. The first segment 600 also contains the common nodes <title> 615, <link> 620, and <description> 625. Segment 600 includes the non-common data elements of the <item> node 630 containing the <album> node 635 for "Blood on the Tracks" and the corresponding <review> node 640. The first segment 600 does not contain the <item> node 650 containing the <album> node 655 for "Master of Puppets" and its corresponding <review> 660.

The second segment 670 also contains the <title> 615, <link> 620, and <description> 625 nodes. In some embodiments, other segments do not need to contain the additional nodes that are already within a different segment. The second segment 670 contains the <item> node containing the review for the album "Master of Puppets". The second segment 670 does not contain the <item> node 630 containing the <album> node 635 for "Blood on the Tracks" and its corresponding <review> 640.

In some embodiments, parent nodes, such as <rss> 605 and <channel> 610 nodes are not included in a segment. In other embodiments, sibling nodes, such as <title> 615, <link> 620, and <description> 625 nodes are not included in a segment. For example, segment 670 could only include the <item> node 650. In some embodiments, the transformation file would have to be altered to handle different segments. For example, the XSL style sheet may be altered to take out references to such deleted nodes if the transformation does not require them.

Step 520 transforms the data elements in each segment independently. Each transformation may be done independently because the transformation of one segment does not need data in other segments. In one embodiment, each segment is loaded into memory, transformed, and then unloaded from memory before the next transformation can occur. In other embodiments, two or more segments are loaded into memory at the same time. Since each segment contains a smaller data structure than the starting data structure, a smaller amount of data is transformed at any one time. This approach guarantees an improvement in overall usage of computing resources, such as memory. Specifically, regarding FIG. 6, when segment 600 is being transformed <item> node 650 is not loaded into memory. This is opposed to loading the starting data structure, for example an XML document, in its entirety. Additionally, since the transformation of segments is independent of another, transformations may be done on a separate processor.

In one embodiment, step 520 uses an XSL stylesheet using a standard XSL transformation process, for example, XSL processor 210. In one embodiment, each targeted 'for-each' loop is wrapped with a dummy XSL node in the XSL document. The dummy nodes may signify the beginning and ending of non-common data in the transformed segment. In another embodiment, the tags of the transformed data may signify the beginning and ending of non-common data in the transformed segment. In embodiments, where select statements in XSL stylesheet include 'position( )', 'count( )', or 'last( )' in referencing targeted element, then an offset may be added.

In some embodiments, only some of the data elements of a segment are transformed. In other embodiments, all of the data elements of a segment are transformed. In some embodiments, only the different data of the remaining N−1 segments is transformed for each segment. In another embodiment, step 520 writes each transformed segment or part of a transformed segment to a new file. In other embodiments, step 520 appends a transformed segment or part of a transformed segment to an existing transformed segment.

Figure 7:
FIG. 7 illustrates two transformed segments created in accordance with an embodiment of the present invention.
Figure 7:
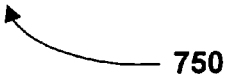

FIG. 7 illustrates the transformed segments 700 and 750 corresponding to segments 600 and 670 of FIG. 6. Note that transformed segment 700 is the same as file 400 until the dummy <begin> node 710. The dummy <begin> node 710 acts as a placeholder to signify that the following data is not common to the other segments. Segment 700 also includes a dummy <end> node 720 signifying that end of data not common to the other segments. Any segment may include zero, only one placeholder per set of non-common data, or two. If a segment has multiple sets of non-common data then multiple placeholders are possible. Any type of placeholders may be used, including a file that points to start and end points of the segment at issue.

In the embodiment of FIG. 7, transformed segment 750 does not include, before the <begin> node 760, all of the data nodes occurring before the <begin> node 710 of segment 700. In other embodiments, a segment may include all of the data occurring before a <begin> node and after an <end> node as in other segments.

Step 525 combines the data elements from multiple transformed segments into one data structure. In one embodiment, a single data structure is formed from all of the transformed segments. This data structure would reflect a full transformation of the entire starting data structure. In other embodiments, multiple data structures may be formed, each from certain transformed segments.

Step 525 may be done "intelligently" without using a large amount of memory. In one embodiment, step 525 may parse a first segment and include everything up until the dummy end wrapper node in the final output document. Dummy wrapper nodes are not included in the output. Step 525 may then move on to a next segment and start parsing from the start of where the first dummy wrapper element begins. Step 525 would then end when the dummy wrapper ends. Step 525 may keep repeating for each segment. For the last segment, Step 525 may parse the contents within the dummy wrapper and then parse the contents after the dummy wrapper.

In other embodiments, the transformed segment may be used as the final output document and data may be added to it. Another transformed segment may then be parsed through to find the non-common data, possibly by use of previously made placeholders. This non-common data may be extracted, and then the output document may be parsed to determine where the non-common data is to be put. In some embodiments, only certain data of a segment is transformed, and then added to the final output document. Common data from another transformed segment also may be extracted and added to the output document. The transformed data from one segment may be placed in any suitable place within the final output document.

Within embodiments of the present invention, the hierarchical data structure may be organized in any document or document-like object, including vector graphics, e-commerce transactions, mathematical equations, object metadata, server APIs, and many other kinds of structured information. The data in a document may have come from a database, from a FAT file, or any other appropriate source.

In embodiments using XML, the hierarchy of the data in an XML document may also be expressed through an XML schema. An XML schema can be used to define an XML document, typically expressed in terms of constraints on the structure and content of documents of that type. An XML Schema typically defines the legal building blocks of an XML document. An XML Schema may: define elements that can appear in a document; define attributes that can appear in a document; define which elements are child elements; define the order of child elements; define the number of child elements; define whether an element is empty or can include text; define data types for elements and attributes; and define default and fixed values for elements and attributes. This collection of information is often referred to as the Post-Schema Validation Infoset (PSVI). The PSVI can give a valid XML document its "type" and can facilitate treating the document as an object, using object-oriented programming (OOP) paradigms.

In embodiments using XSL transformations, a source tree does not always have to be derived from an XML file, since it may be more efficient for the processor to read from an in-memory document object model (DOM) object or some other implementation-specific representation. In this manner, XSL transformations may avoid locking implementations into system-specific APIs and memory, network and file I/O issues.

Similarly, output may be in any format. Often, XSL processing ends by writing the result tree to an output document. The output document may be XML, but can be HTML, RTF, TeX, delimited files, plain text or any other format that the XSL processor is capable of producing. Commonly, the XSL processor may transform an XML file into an HTML file, and use an HTML browser as the formatting engine. This is possible because, for all intents and purposes, HTML is just one example of an XML vocabulary, and XSL is capable of using any XML vocabulary as its target.

Output may also be an XSL-FO document, which is an XML file with output information. XSL-FO is an XML-based markup language describing the formatting of XML data for output to screen, paper or other media. XSL-FO documents contain information about the output layout and output contents. The XSL stylesheet specifies the presentation of a class of XML documents by describing how an instance of the class is transformed into an XML document that uses a formatting vocabulary, such as (X)HTML or XSL-FO. Given a class of arbitrarily structured XML documents or data files, designers can use an XSL stylesheet to express their intentions about how that structured content should be presented; that is, how the source content should be styled, laid out, and paginated onto some presentation medium, such as a window in a Web browser or a hand-held device, or a set of physical pages in a catalog, report, pamphlet, or book.

In embodiments where a segment is still quite large, it is possible to have the segment stored on disk and elements are read off when needed. This is a 'scalable' feature. Thus, if the number of recursive children for a segment exceeds a certain threshold, the transformation for this XML segment may use the 'scalable' feature. However, this method can be slow as the time required to read and write from disk is much higher than the processor time to sort and reorganize the data. This 'scalable' feature can also be done independently from any segmentation process; that is it may be used on the entire data structure.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of transforming data from a first hierarchical data structure into a second hierarchical data structure, comprising:
   determining which segments within the first hierarchal data structure are separable by determining segments which are not referenced by another segment;
   separating the determined separable segments from the first hierarchical data structure into individual segments;
   transforming each individual segment, wherein the transforming of a set of one or more segments that comprise a portion of the first hierarchical data structure is done independently from transforming another set, and wherein the transforming is defined by a transformation file;
   analyzing the transformation file to determine one or more sets of repeated transformations that are separable;
   analyzing the first hierarchical data structure to estimate which set of the separable transformations will utilize the most computing resources, wherein the analyzing comprises counting the data elements and their descendants accessed within a set of transformations, and wherein the number of segments is based upon the number of data elements and their descendants;
   in response to the number of data elements and their descendants in a set of the separable transformations providing a beneficial reduction in the use of the computing resources, segmenting the set of the separable transformations; and
   combining the separable transformed segments to form the second hierarchical data structure, by parsing each segment separately until all segments have been parsed.

2. The method of claim 1, further comprising:
   loading a set of one or more segments into memory before transforming a segment of that set; and
   unloading a segment from that set from memory before another set is loaded into memory.

3. The method of claim 1, wherein each segment uniquely contains a first data element that is a sibling of a second data element uniquely contained within another segment.

4. The method of claim 3, wherein each segment uniquely contains a sibling having the same parent as the siblings in the other segments.

5. The method of claim 1, wherein the segments contain common data.

6. The method of claim 1, further comprising:
   marking at least one of the beginning and ending of a first non-common transformed data within a first transformed segment.

7. The method of claim 1, wherein the combining comprises:
   inserting, into a document containing a first non-common transformed data of a first segment, a second non-common transformed data of a second segment.

8. The method of claim 7, further comprising:
   inserting, into the document, common transformed data of the second segment.

9. The method of claim 1, further comprising:
   separating a segment into sub-segments;
   transforming each sub-segment of the segment; and
   combining each transformed sub-segment.

10. The method of claim 1, wherein the first and second hierarchical data structures are defined within XML files.

11. The method of claim 1, wherein the transforming of one segment is done on a different processor than the transforming of a second segment.

12. An information storage medium having a plurality of instructions adapted to direct an information processing device to perform an operation for transforming data from a first hierarchical data structure into a second hierarchical data structure, the operation comprising the steps of:

determining which segments within the first hierarchal data structure are separable by determining segments which are not referenced by another segment;

separating the determined separable segments from the first hierarchical data structure into individual segments;

transforming each individual segment, wherein the transforming of a set of one or more segments that comprise a portion of the first hierarchical data structure is done independently from transforming another set, and wherein the transforming is defined by a transformation file;

analyzing the transformation file to determine one or more sets of repeated transformations that are separable;

analyzing the first hierarchical data structure to estimate which set of the separable transformations will utilize the most computing resources, wherein the analyzing comprises counting the data elements and their descendants accessed within a set of transformations, and wherein-the number of segments is based upon the number of data elements and their descendants;

in response to the number of data elements and their descendants in a set of the separable transformations providing a beneficial reduction in the use of the computing resources, segmenting the set of the separable transformations; and combining the separable transformed segments to form the second hierarchical data structure, by parsing each segment separately until all segments have been parsed.

13. The information storage medium of claim 12, further comprising:

loading a set of one or more segments into memory before transforming a segment of that set; and unloading a segment from that set from memory before another set is loaded into memory.

14. The information storage medium of claim 12, wherein each segment uniquely contains a first data element that is a sibling of a second data element uniquely contained within another segment.

15. The information storage medium of claim 14, wherein each segment uniquely contains a sibling having the same parent as the siblings in the other segments.

16. The information storage medium of claim 12, wherein the segments contain common data.

17. The information storage medium of claim 12, further comprising:

marking the beginning and/or ending of a first non-common transformed data within a first transformed segment.

18. The information storage medium of claim 12, wherein the combining comprises:

inserting, into a document containing a first non-common transformed data of a first segment, a second non-common transformed data of a second segment.

19. The information storage medium of claim 18, further comprising:

inserting, into the document, common transformed data of the second segment.

20. The information storage medium of claim 12, further comprising:

separating a segment into sub-segments;

transforming each sub-segment of the segment; and combining each transformed sub-segment.

21. The information storage medium of claim 12, wherein the first and second hierarchical data structures are defined within XML files.

22. The information storage medium of claim 12, wherein the transforming of one segment is done on a different processor than the transforming of a second segment.

\* \* \* \* \*

UNITED STATES PATENT AND TRADEMARK OFFICE
CERTIFICATE OF CORRECTION

| | | |
|---|---|---|
| PATENT NO. | : 7,774,699 B2 | |
| APPLICATION NO. | : 11/372929 | |
| DATED | : August 10, 2010 | |
| INVENTOR(S) | : Mark Lin | |

It is certified that error appears in the above-identified patent and that said Letters Patent is hereby corrected as shown below:

In column 11, line 24, in claim 12, delete "wherein-the" and insert -- wherein the --, therefor.

Signed and Sealed this
Tenth Day of May, 2011

David J. Kappos
*Director of the United States Patent and Trademark Office*